US010152997B1

(12) United States Patent
Chu et al.

(10) Patent No.: US 10,152,997 B1
(45) Date of Patent: Dec. 11, 2018

(54) LASER CURRENT CALIBRATION USING PREAMPLIFIER

(71) Applicant: Seagate Technology LLC, Cupertino, CA (US)

(72) Inventors: Alfredo Sam Chu, Prior Lake, MN (US); Todd Michael Lammers, Lafayette, CO (US); Thomas Lee Schick, Arvada, CO (US); Robert Matousek, Berthoud, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/660,832

(22) Filed: Jul. 26, 2017

Related U.S. Application Data (60) Provisional application No. 62/518,241, filed on Jun. 12, 2017.

(51) Int. Cl.
  *G11B 5/09* (2006.01)
  *G11B 20/10* (2006.01)
  *G11B 5/60* (2006.01)
(52) U.S. Cl.
  CPC ............ *G11B 20/105* (2013.01); *G11B 5/607* (2013.01)
(58) Field of Classification Search
  None
  See application file for complete search history.

(56) References Cited

U.S. PATENT DOCUMENTS

| 5,495,463 | A | * | 2/1996 | Akagi | G11B 7/0045 |
| | | | | | 369/100 |
| 6,160,779 | A | * | 12/2000 | Usui | G11B 7/0045 |
| | | | | | 369/59.23 |
| 6,950,378 | B1 | * | 9/2005 | Miyazaki | G11B 7/126 |
| | | | | | 369/47.52 |
| 9,741,385 | B1 | * | 8/2017 | Rausch | G11B 7/1263 |
| 2007/0109928 | A1 | * | 5/2007 | Kuwahara | G11B 7/00456 |
| | | | | | 369/44.31 |
| 2008/0253749 | A1 | * | 10/2008 | Kablau | G11B 7/0062 |
| | | | | | 386/334 |
| 2009/0185464 | A1 | * | 7/2009 | Miyazaki | G11B 7/0062 |
| | | | | | 369/47.5 |
| 2014/0029396 | A1 | | 1/2014 | Rausch | |

* cited by examiner

*Primary Examiner* — Peter Vincent Agustin
(74) *Attorney, Agent, or Firm* — Cesari & Reed, LLP; Kirk A. Cesari; Logan Brown (57) ABSTRACT

Systems and methods of laser bias calibration are presented. A preamplifier circuit may configure a laser current supplied to a laser emitter to be a first laser current of the plurality of laser currents during the writing of one or more first sectors. The preamplifier may further detect one or more gaps in a write power signal while the laser current of the laser emitter is configured to be the first laser current. In response to the detection of the one or more gaps in the write power signal, the preamplifier may configure the laser current supplied to the laser emitter to be a second laser current of the plurality of laser currents during the writing of one or more second sectors. The preamplifier circuit may be utilized in a heat assisted magnetic recording device.

20 Claims, 7 Drawing Sheets

LASER CURRENT CALIBRATION USING PREAMPLIFIER

CROSS-REFERENCE TO RELATED APPLICATION

This application is a non-provisional of and claims priority to U.S. Provisional Patent Application No. 62/518,241 filed on Jun. 12, 2017 and entitled "Laser Current Calibration Using Preamplifier," which is incorporated herein by reference in its entirety.

SUMMARY

In some embodiments, a device can comprise a preamplifier circuit including an output to configure a current supplied to a laser emitter and a laser current calibration circuit. The laser current calibration circuit may control the laser current supplied to the laser emitter during writing of calibration data to a storage medium. The calibration data being used to determine a particular laser current of a plurality of laser currents for the laser emitter. The laser current calibration circuit may further configure the laser current of the laser emitter to a first laser current of the plurality of laser currents, write one or more first sectors while the laser current of the laser emitter is the first laser current and detect one or more gaps in a write power signal while the laser current of the laser emitter is the first laser current. Moreover, in response to the detection of the one or more gaps in the write power signal, the laser current calibration circuit may configure the laser current of the laser emitter to a second laser current of the plurality of laser current and write one or more second sectors while the laser current of the laser emitter is the second laser current.

In some embodiments, a circuit can include an output to provide laser current to a laser emitter and a laser current calibration circuit configured to control the laser current supplied to the laser emitter by the output during writing of calibration data to a storage medium. The laser current calibration circuit may configure the laser current of the laser emitter to a first laser current of a plurality of laser currents, write one or more first sectors while the laser current of the output is the first laser current and detect one or more gaps in a write power signal while the laser current of the output is the first laser current. In response to the detection of the one or more gaps in the write power signal, the laser current calibration circuit may further configure the laser current of the output to a second laser current of the plurality of laser currents and write one or more second sectors while the laser current of the output is the second laser current. The circuit may also include an input that receives read data from a write head, the read data including the calibration data written to the storage medium and a second output configured to provide the read data to a controller. The circuit may also include the controller which may analyze the calibration data of the read data and select a particular laser current of the plurality of laser currents for the laser emitter.

In some embodiments, a method can include configuring a current supplied to a laser emitter to be a first laser current of the plurality of laser currents during the writing of one or more first sectors and detecting one or more gaps in a write power signal while the laser current of the laser emitter is configured to be the first laser current. In response to the detection of the one or more inter-sector gaps in the write power signal, the method may configure the laser current supplied to the laser emitter to be a second laser current of the plurality of laser currents during the writing of one or more second sectors.

DETAILED DESCRIPTION

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, dedicated hardware implementations including, but not limited to, application specific integrated circuits, programmable logic arrays, and other hardware devices can be constructed to implement the methods and functions described herein. Further, the methods and functions described herein may be implemented as a device, such as a memory device, including instructions that when executed cause a processor to perform the methods.

Embodiments according to the present disclosure may include heat-assisted magnetic recording (HAMR) systems or methods, which may be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits may be recorded in a storage layer at elevated temperatures in a magnetic media. The use of heat may overcome super-paramagnetic effects that might otherwise limit the areal data density of the media. As such, HAMR devices may have a magnetic write head including, for example, a laser or other circuit for delivering electromagnetic energy to heat a small confined media area (e.g., spot size) at the same time the magnetic write head applies a magnetic field to the media for recording.

A HAMR read/write element, sometimes referred to as a slider, recording head, read head, write head, read/write head, etc., may include magnetic read and write transducers similar to those on current hard drives. For example, data may be read by a magnetoresistive sensor that detects magnetic fluctuations of a magnetic media as it moves underneath the sensor. Data may be written to the magnetic media by a write coil that is magnetically coupled to a write pole. The write pole may change magnetic orientation in regions of the media as it moves underneath the write pole in response to an energizing current applied to the write coil. A HAMR slider may also include a source of energy, such as a laser diode, to heat the media while it is being written to by the write pole. An optical delivery path may be integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer may shape and transmit the energy to a small region on the medium. The plasmonic transducer may sometimes be referred to as a near-field transducer (NFT), optical antenna, surface plasmon resonator, etc., and may include a plasmonic metal such as gold, silver, copper, aluminum, etc., and alloys thereof. The plasmonic transducer for a HAMR device may be very small (e.g., on the order of 0.1 to a few light wavelengths, or any value therebetween) and may create a localized region of high power density in the media through an electromagnetic interaction. This may result in a high temperature rise in a small region on the media, with the region reaching or exceeding the Curie temperature having dimensions less than 100 nm (e.g., ~50 nm).

The laser bias current, $I_{bias}$, may refer to the laser current that may be applied to the laser diode in a HAMR head in read mode, but not doing writing. The operating temperature of the laser may be controlled by controlling the total laser current ($I_{total}$). The total laser current ($I_{total}$) (also referred to herein as laser current) may refer to the total laser current applied to the laser diode. The total laser current ($I_{total}$) may be comprised of the summation of the laser bias current ($I_{bias}$) and the laser operational current ($I_{op}$). Laser bias current, $I_{bias}$, may differ from the total laser current applied to the laser diode during writing. The increase in the current during writing may be referred to as the laser operational current ($I_{op}$) (noting that $I_{op}=I_{total}-I_{bias}$). The total laser current, may be incrementally increased (or decreased) to change the operating temperature of the laser diode. The total laser current may be adjusted by the adjustment or controlling of either one or both of the laser bias or laser operational currents, to control temperature and/or the performance of the writing of magnetic data.

In some embodiments according to this disclosure, methods and systems may be provided for fine laser current calibration in HAMR or similar drives. Fine laser current calibration may set the laser current to an optimal selection based on drive level BER (Bit Error Rate) performance or other write performance metrics. Many factors in the read/write process of a drive may impact BER performance. Some of those factors may include write current waveform programmability, fly height of the head (during write & read mode) and the total amount of laser current (e.g., $I_{total}$).

Calibration of the laser current may be achieved by writing data using multiple laser current settings, reading the written data, determining the average BER for the multiple laser current settings, and selecting the laser current based on the determined average BERs (e.g. selecting the best performing BER). For example, calibration may include writing and reading data at various laser current settings, determining BERs for the various laser current settings, building a "bath tub" curve and identifying an optimal laser current that provides a best performing BER.

In some embodiments according to this disclosure, methods and systems may be provided that allow for the writing of data using multiple laser currents in one revolution or with a single command initiating the preamplifier (preamp) to begin a procedure that may be automatically performed within the preamp.

In some examples, the preamp may also adjust the write heater current during the calibration of the laser current. For example, a preamp configured to perform the laser current calibration may include controls that may set the laser current and the write heater current. In some examples, the write heater current may refer to write heater current during writing (e.g. when the current supplied to the laser is the total laser current ($I_{total}$)), during reading (e.g. when the current supplied to the laser is the laser bias current ($I_{bias}$)) or both. In some embodiments, changes to both the write heater current and laser current may impact fly height. As such, in some examples, the write heater current may be adjusted when the laser current is changed to maintain a fly height during laser current calibration. For example, where increases to the laser current and write heater current both cause an increase in fly height, the preamp may decrease the write heater current when the laser current is increased or vice versa to maintain the same fly height during the calibration. It should be noted that the change in write heater current to compensate for a change in the laser current may not be the negative of the change in the laser current. In some examples, the relationship between the changes in the currents may be a relationship other than a linear relationship.

In some examples, the preamp may be programmable to store, for each laser current, laser current/write heater current pairs that maintain the fly height (e.g. in one or more registers). In other embodiments, the preamp or a controller of the storage device may determine the write heater current for each laser current that maintains a fly height (e.g. based on a known relation between the laser current and write heater current).

In addition, the preamp may be configured to loop the laser current and write heater current through a range of values in programmable steps. Further, a number of sectors, servo gaps or gates between steps, a number of times the range is repeated or whether the range is to be repeated for a complete revolution or a portion thereof, what type of gates or other indicia to use for triggering the steps, and so on may be programmable. Additional details of preamps that may perform the laser current calibration are provided below with regard to FIGS. 5-7.

In some examples, the preamp may change the laser current and write heater current on inter-sector gap boundaries to provide many variations of the laser current and the write heater current around a revolution of the disc. In some such examples, there may be greater than 300 sectors of 4K size around a revolution of the disc allowing the write portion of the calibration process to repeat a series of various laser current/write heater current combinations. By collecting and averaging the BER of sectors written using each laser current/write heater current combinations, and determining the "best" BER, the laser current may be calibrated in two revolutions of the disc.

Figure 1:
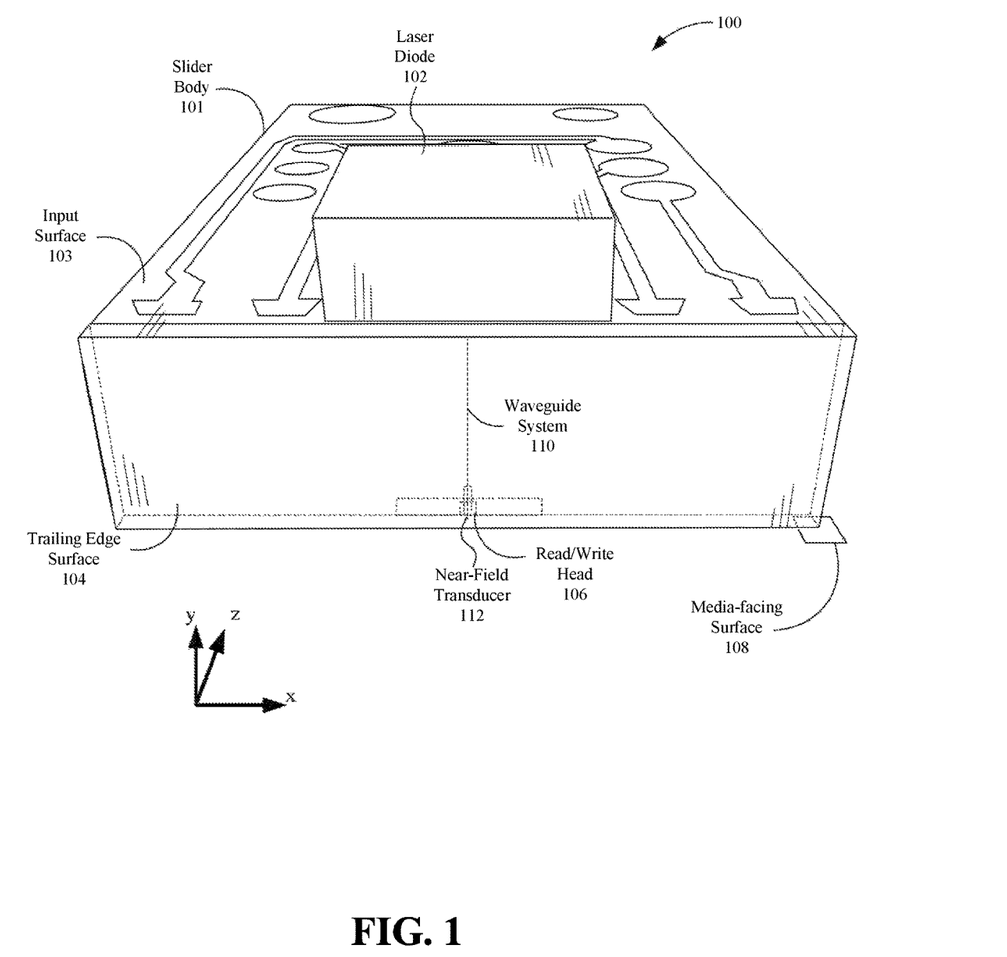
FIG. 1 illustrates a perspective view that shows a HAMR slider assembly, in accordance with certain embodiments of the present disclosure.

FIG. 1 illustrates a perspective view that shows a HAMR slider assembly 100, in accordance with certain embodiments of the present disclosure. The slider assembly 100 may include a laser diode 102 located on input surface 103 of a slider body 101. In this example, the input surface 103 may be a top surface, which may be located opposite to a media-facing surface 108 that may be positioned over a surface of a recording media (not shown) during device operation. The media-facing surface 108 may face and may be held proximate to the moving media surface while reading and writing to the media. The media-facing surface 108 may be configured as an air-bearing surface (ABS) that may maintain separation from the media surface via a thin layer of air.

The laser diode 102 may deliver light to a region proximate a HAMR read/write head 106, which may be located near the media-facing surface 108. The light may heat the recording media as it passes by the read/write head 106. Optical coupling components may be formed integrally within the slider body 101 (near a trailing edge surface 104 in this example) and may function as an optical path that may deliver energy from the laser diode 102 to the recording media via a near-field transducer 112. The near-field transducer 112 may be near the read/write head 106 and may cause heating of the media during recording operations.

The laser diode 102 in this example may be configured as either an edge-emitting laser or surface-emitting laser. Generally, an edge-emitting laser may emit light from near a corner edge of the laser and a surface emitting laser may emit light in a direction perpendicular to a surface of the laser body, e.g., from a point near a center of the surface. An edge-emitting laser may be mounted on the top surface 103 of the slider body 101 (e.g., in a pocket or cavity) such that the light may be emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
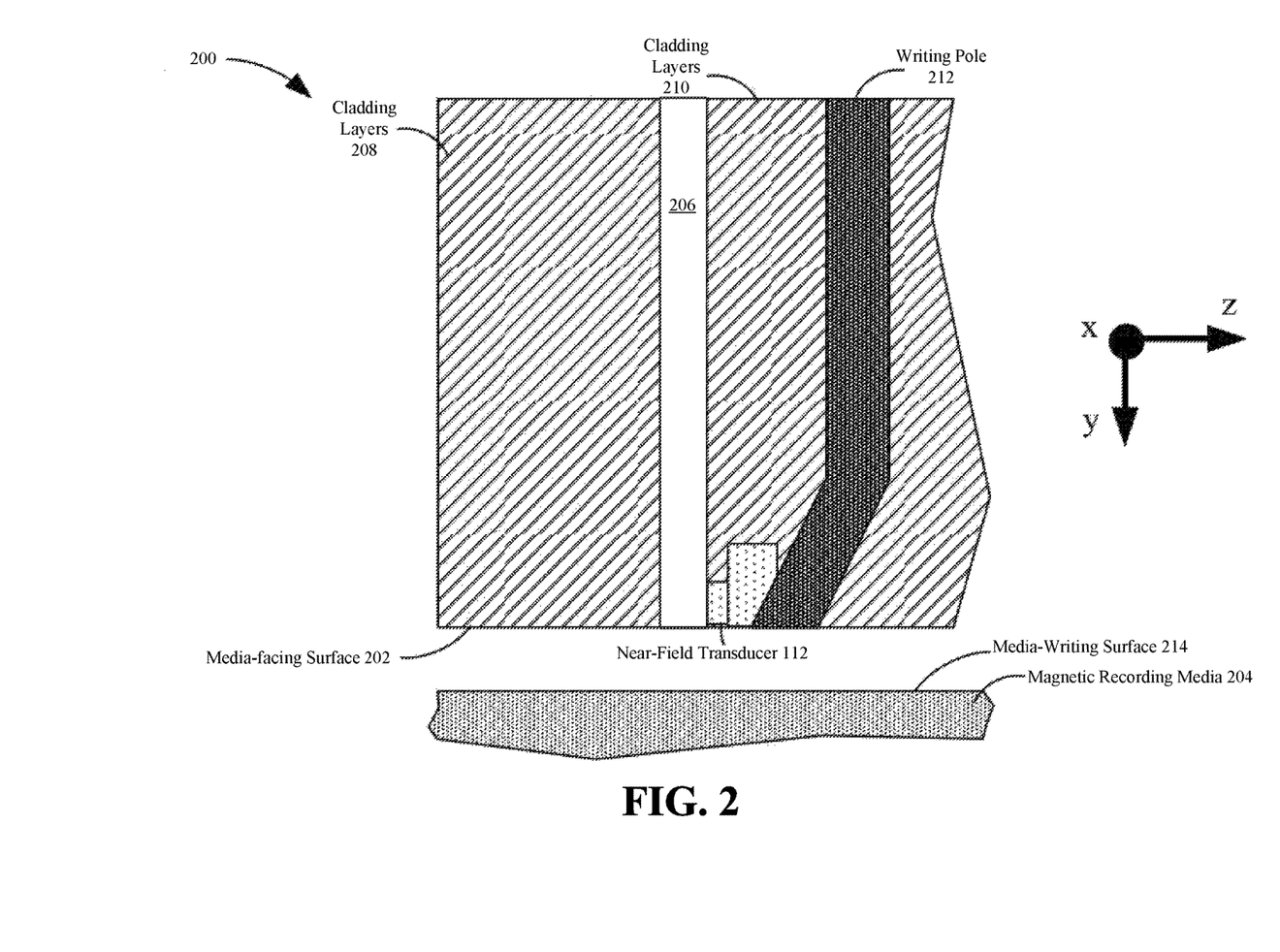
FIG. 2 illustrates a cross-sectional view that shows a HAMR apparatus, in accordance with certain embodiments of the present disclosure.

FIG. 2 illustrates a cross-sectional view that shows a HAMR apparatus 200, in accordance with certain embodiments of the present disclosure. A near-field transducer 112 may be located proximate a media-facing surface 202 (e.g., ABS), which may be held near a magnetic recording media 204 during device operation. In the orientation of FIG. 2, the media-facing surface 202 is arranged parallel to the x-z plane. A waveguide core 206 may be disposed proximate the NFT 112, which may be located at or near the media writing surface 214.

The waveguide core 206 may be surrounded by cladding layers 208 and 210. The waveguide core 206 and cladding layers 208 and 210 may be made from dielectric materials. Generally, the dielectric materials may be selected so that the refractive index of the waveguide core layer 206 is higher than refractive indices of the cladding layers 208 and 210. This arrangement of materials may facilitate efficient propagation of light through the waveguide. Light may be delivered from the waveguide core 206 along the negative y-direction where it may be coupled to the NFT 112. The NFT 112 may deliver surface plasmon enhanced, near-field electromagnetic energy along the y-axis where it may exit at the media writing surface 214. This may result in a highly localized hot spot (not shown) on the media surface 214 when the media 204 is placed in close proximity to surface 202 of the apparatus 200. Further illustrated in FIG. 2 is a write pole 212 of the read/write head that may be located alongside the NFT 112. The write pole 212 may generate a magnetic field (e.g., perpendicular field) used in changing the magnetic orientation of the hotspot during writing.

Figure 3:
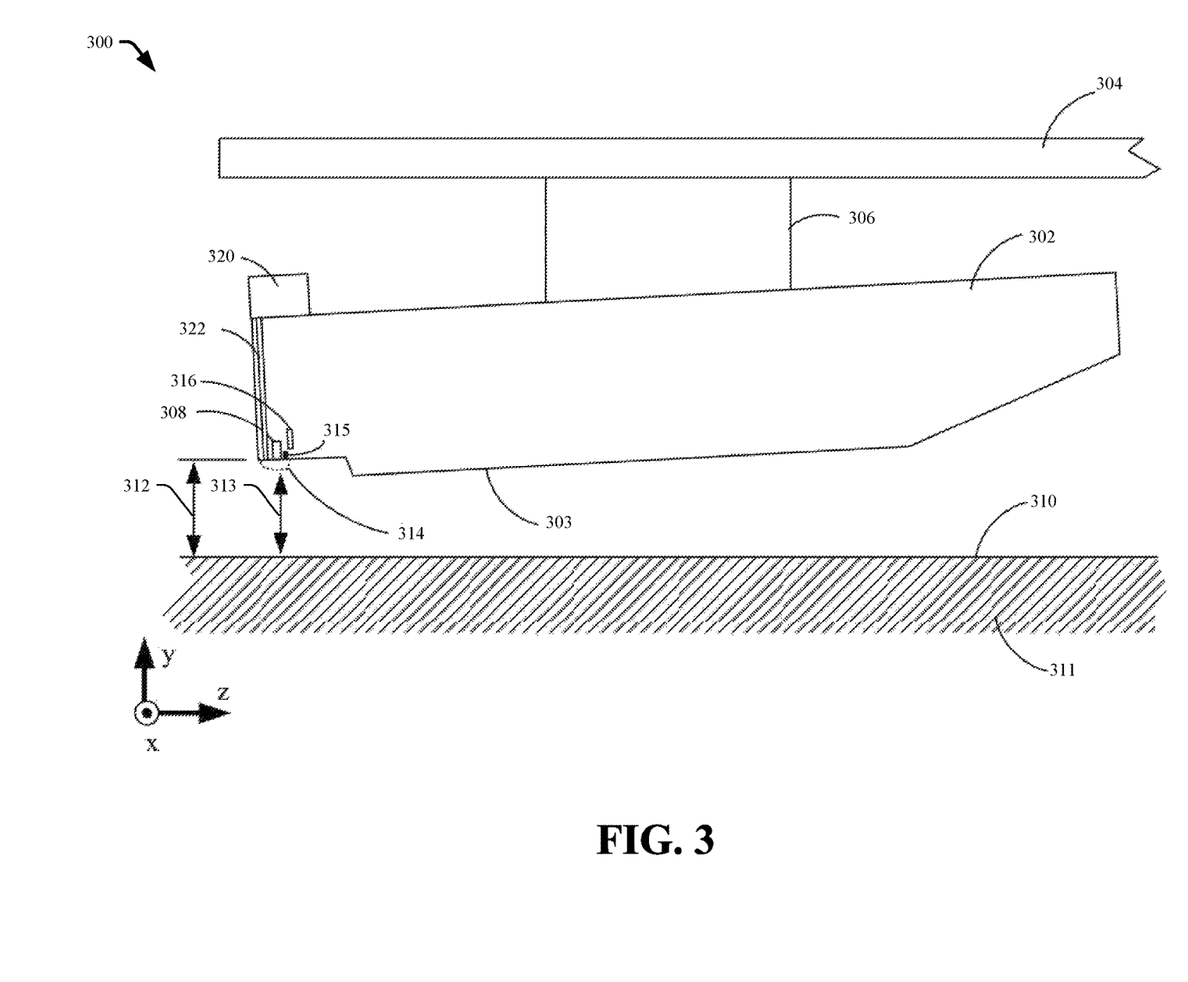
FIG. 3 illustrates a side view of a read/write head that may be configured for heat-assisted magnetic recording, in accordance with certain embodiments of the present disclosure.

FIG. 3 illustrates a side view of a read/write head 302 that may be configured for heat-assisted magnetic recording, in accordance with certain embodiments of the present disclosure. The read/write head 302 may be used in a magnetic data storage device, e.g., a hard disk drive. The read/write head 302 may also be referred to herein as a slider, read/write transducer, recording head, etc. The read/write head 302 is coupled to an arm 304 by way of a suspension 306 that allows some relative motion between the read/write head 302 and arm 304. The read/write head 302 includes read/write transducers 308 at a trailing edge that are held proximate to a surface 310 of a magnetic recording medium 311, e.g., a magnetic disk. The read/write head 302 may further include a laser 320 and a waveguide 322. The waveguide 322 may deliver light from the laser 320 to components (e.g., a near-field transducer) near the read/write transducers 308.

When the read/write head 302 is located over surface 310 of recording medium 311, a fly height 312 may be maintained between the read/write head 302 and the surface 310 by a downward force of arm 304. This downward force may be counterbalanced by an air cushion that exists between the surface 310 and an air bearing surface 303 (also referred to herein as a "media-facing surface") of the read/write head 302 when the recording medium 311 is rotating. It may be desirable to maintain a predetermined slider fly height 312 over a range of disk rotational speeds during both reading and writing operations to ensure consistent performance. Region 314 is a "close point" of the read/write head 302, which is generally understood to be the closest spacing between the read/write transducers 308 and the magnetic recording medium 311, and generally may define the head-to-medium spacing 313.

To account for both static and dynamic variations that may affect slider fly height 312, the read/write transducer 302 may be configured such that a region 314 of the read/write transducer 302 can be configurably adjusted during operation in order to finely adjust the head-to-medium spacing 313. This may be shown in FIG. 3 by a dotted line that represents a change in geometry of the region 314. In this example, the geometry change may be induced, in whole or in part, by an increase or decrease in temperature of the region 314 via one or more heaters 316 (e.g., a write heater(s), a read heater(s), etc.). A thermal sensor 315 may be situated at or near the close point 314 (e.g., adjacent the read/write transducers 308, such as near the near-field transducer) or may be positioned at another location of the ABS 303.

Figure 4:
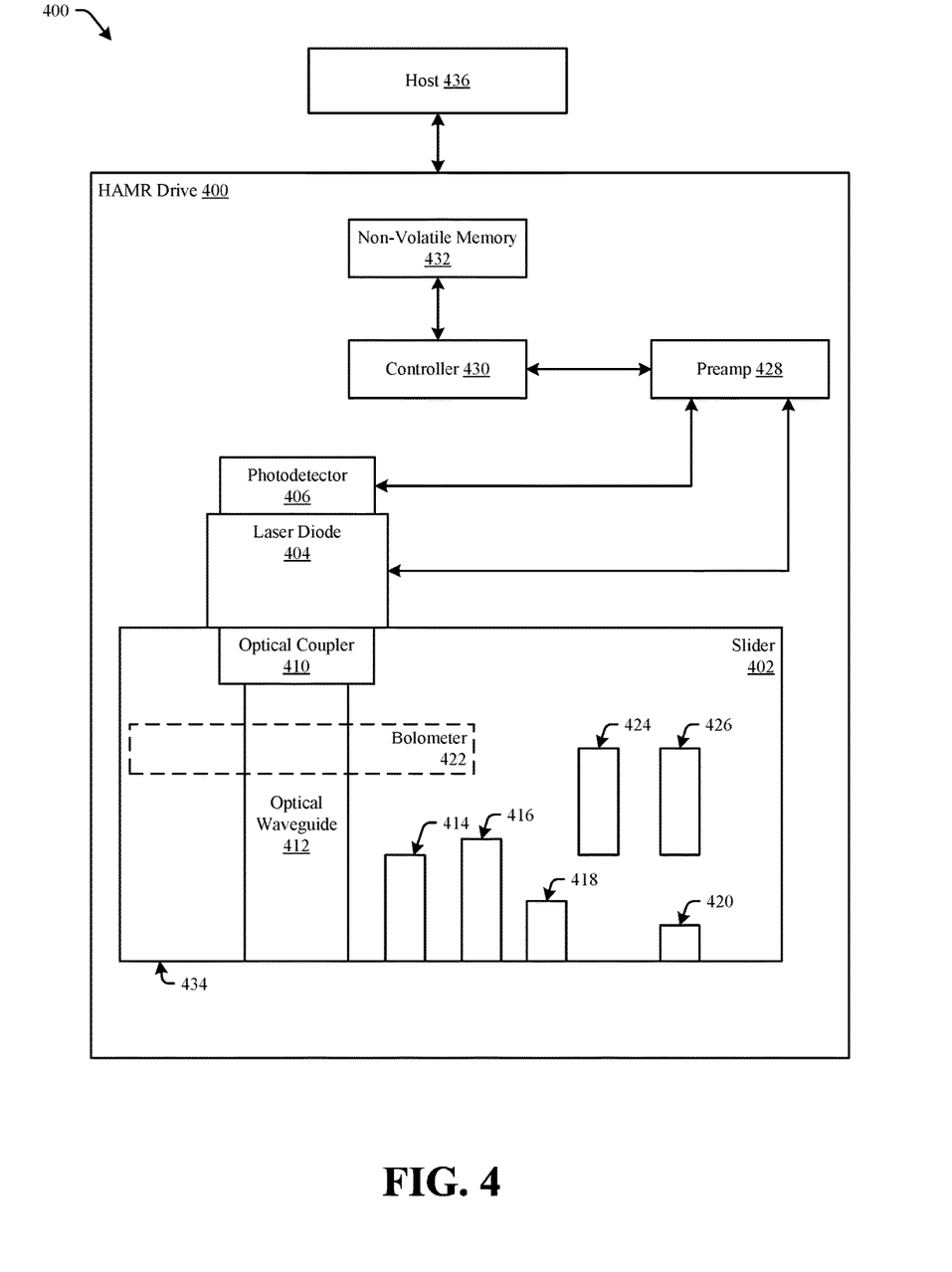
FIG. 4 illustrates a block diagram of a system for calibrating a laser of a HAMR head, in accordance with certain embodiments of the present disclosure.

FIG. 4 illustrates a block diagram of a system for calibrating a laser of a HAMR head, in accordance with certain embodiments of the present disclosure. FIG. 4 shows a portion of a HAMR drive 400 which may include a slider 402 upon which a laser diode 404 may be mounted. A photodetector 406 may be mounted on or in close proximity to the laser diode 404. A preamp 428 may be coupled to the laser diode 404 and may provide a current (e.g., $I_{total}$ or $I_{bias}$) to the laser diode 404. Alternatively or in addition, the preamp 428 may control a separate power supply to output current to the laser diode 404. An output of the photodetector 406 may also be coupled to the preamp 428. The preamp 428 may adjust the current supplied to the laser diode 404 in response to the photodetector 406 output.

The slider 402 may include a number of components including an optical waveguide 412 which may be optically coupled to the laser diode 404 via an optical coupler 410. The optical waveguide 412 may extend from the optical coupler 410 to an NFT 414 situated at the air bearing surface 434 proximate the optical waveguide 412. In some embodiments, a bolometer 422 may be situated proximate the optical waveguide 412. A writer 416 may be situated proximate the NFT 414. A write heater 424 may be situated proximate the writer 416 and configured to thermally actuate the writer 416 (e.g., writer pole/NFT) in response to changes in a write heater current. A contact sensor 418 may be situated proximate the writer 416 and NFT 414 (e.g., at a close point of the writer). A reader 420 may be positioned away from the writer 416 and contact sensor 418. A read heater 426 may be positioned proximate the reader 420 and configured to thermally actuate the reader 420 in response to changes in a read heater current. In some embodiments, the preamp 428 may be coupled to one or both of the write heater 424 and the read heater 426 and may provide the write heater current and the read heater current to the write heater 424 and the read heater 426, respectively. Alternatively or in addition, the preamp 428 may control a separate power supply to output currents to the write heater 424 and the read heater 426.

The HAMR drive 400 may further include a controller 430 (e.g., microprocessor or microcontroller) coupled to a non-volatile memory 432. Among other functions, the controller 430 may be configured to initiate laser bias calibration for the HAMR head in accordance with various embodiments. For example, the controller 430 may be configured to instruct the preamp 428 to implement the writing and reading portion of the calibration processes disclosed herein. The controller 430 may determine the BER of the read data as part of the calibration processes disclosed herein, store the laser current that corresponds to the best write performance metric as discussed hereinabove in the memory 432. The controller 430 can also set the $I_{bias}$, $I_{op}$, or $I_{total}$ of the laser diode for normal operations to the optimum $I_{bias}$, $I_{op}$, or $I_{total}$, stored in the memory 432.

The preamp 428 may implement the writing mode portion of the laser current calibration processes for the HAMR head in accordance with various embodiments. The preamp 428 can provide $I_{bias}$ or $I_{total}$ (e.g. $I_{bias}+I_{op}$) to the laser diode in accordance an instruction of the controller. During laser bias current calibration, the preamp may automatically provide the laser current to the laser diode 404 during laser current calibration according to a desired $I_{bias}$, $I_{op}$, or $I_{total}$ adjustment pattern. The preamp 428 may further provide write heater currents for setting the operational current supplied to the write heater 424 and may automatically provide write heater current to the write heater 424 during laser calibration according to the desired adjustment pattern of the laser current. For example, the preamp 428 may be configured to automatically adjust the $I_{bias}$, $I_{op}$, or $I_{total}$ and write heater current through, for example, a range of values in accordance with an instruction from the controller 430. The preamp 428 may adjust the write heater current in relation to the laser current such that the effect on the fly height from changes to the $I_{bias}$, $I_{op}$, or $I_{total}$ may be countered.

When writing sectors with multiple laser currents around the revolution of the medium, some examples may ensure that each sector is written using a corresponding laser currents (e.g. even when a sector is a split sector). A split sector is a sector that has one or more servo gaps (SGs) between inter-sector gaps (ISGs) that bound the sector. A gap may be a change in a signal in which the signal changes twice. In FIG. 4, a gap may occur in a write power signal at ISGs and SGs when writing stops and then writing resumes or reading beginning and then reading stopping (e.g., during a write mode). The preamp of some examples may be configured (e.g. include circuitry) to determine whether a gap is a servo gap or an ISG. By discarding or ignoring SGs, the laser current calibration process may ensure that the laser current and write heater current may change in response to inter-sector gaps and not in response to servo gaps. In other examples, the laser current calibration process may be configured such that the laser current and write heater current may change in response to servo gaps and not inter-sector gaps, both or may be programmable to select among various types of gaps.

In some embodiments, a host 436 may be coupled to the HAMR drive 400, for example. The host 436, which can be a computer, a host bus adapter, a bus expander, a server, a telephone, a music player, another electronic device, or any combination thereof. The HAMR drive 400 can communicate with the host device 436 via the hardware and firmware based host interface circuit that may include a connector that allows the HAMR drive 400 to be physically connected and physically disconnected from the host device 436. The host 436 may be configured to communicate with the HAMR drive 400, for example, to request the HAMR drive 400 store data or retrieve previously stored data for the host 436.

In some embodiments, the host 426 may communicate with a HAMR drive 400 via a hardware and firmware-based interface circuit. The interface may comprise any interface that allows communication between a host 426 and a HAMR drive 400, either wired or wireless, such as Universal Serial Bus (USB), IEEE 1394 (Institute of Electrical and Electronics Engineers standard 1394), Compact Flash, Serial AT Attachment (SATA), external SATA (eSATA), Parallel ATA (PATA), Small Computer System Interface (SCSI), Serial Attached SCSI (SAS), Peripheral Component Interconnect Express (PCIe), Fibre Channel, Ethernet, or Thunderbolt, among others. The interface may include a connector (not shown) that allows the HAMR drive 400 to be physically removed from the host 426. In some embodiments, the HAMR drive 400 may have a casing or housing containing the components of the HAMR drive 400, or the components of the HAMR drive 400 may be attached to the housing, or a combination thereof.

Figure 5:
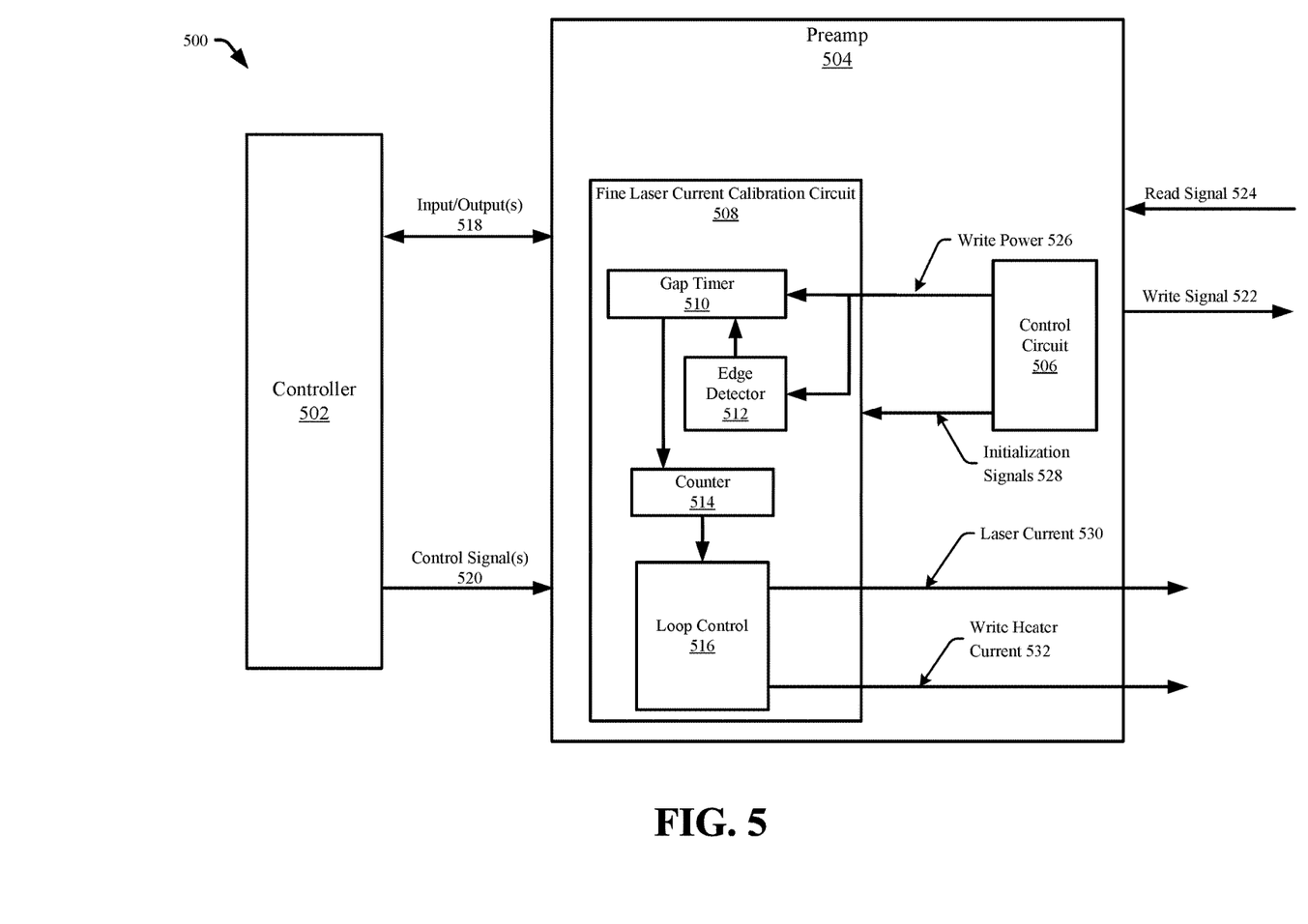
FIG. 5 is a diagram of a system of laser current control, in accordance with certain embodiments of the present disclosure.

Referring to FIG. 5, a diagram of a system of laser current control is shown and generally designated 500, in accordance with certain embodiments of the present disclosure.

Specifically, FIG. 5 provides a functional block diagram of an example. The controller 502 and preamp 504 may part of a hard disc drive (HDD), a hybrid storage device, an optical storage device, or other type of storage device. In some embodiments, the controller 502 and preamp 504 may be part of a HAMR drive such as those shown in FIGS. 1-4. As discussed above, a HAMR drive can include one or more data storage mediums, such as one or more disc(s), which can be a magnetic disc or an optical disc for data storage. Further, multiple discs may be included, and each storage surface of the discs may have a respective laser emitter and write head that allow storage of data to the respective surface. In some embodiments, the a HAMR drive may be a heat-assisted magnetic recording (HAMR) device that may utilize the laser emitter to heat an area of the disc while the head is writing data to the heated area. Further, a storage surface may include multiple tracks for data storage, where each track may be divided into multiple data sectors and multiple servo wedges.

The preamp 504 may include a control circuit 506 and a fine laser current calibration circuit 508. The fine laser current calibration circuit 508 may include a gap timer 510, an edge detector 512, a counter 514, and a loop control circuit 516. The controller 502 and the preamp 504 may include other circuitry for performing functions other than the fine laser current calibration. These are not shown for ease of illustration.

In operation, the controller 502 may send inputs to the preamp 504 and receive output from the preamp 504 as inputs and outputs 518. For example, the inputs and outputs 518 may be write data and read data, respectively. In addition, the controller may send control signals 520 to the preamp 504 that control the operation of the preamp 504.

In some examples, the controller 502 may send control signals 520 to the preamp 504 that may specify the laser current (e.g. $I_{bias}$, $I_{op}$, or $I_{total}$) and write heater current to be used in a writing mode during normal operation. For example, the laser current and write heater current used to write data may be determined based on a laser current calibration process.

For the calibration process disclosed herein, the controller 502 may issue control signals 520 that may include a set of one or more laser currents and write heater currents to be used in the calibration process or one or more range(s) of laser currents and write heater currents and one or more step size(s) to be used in traversing the range(s). In addition, the control signals 520 for the calibration process may instruct the preamp 504 to perform the calibration for a number of traversals of the set or range of laser currents and corresponding write heater currents or to perform the calibration for one or more revolution or portions of a revolution (e.g. a total number of sectors, a number of servo gaps, a number of bits, etc.). Further, the control signals 520 for the calibration process may indicate how long each step may be (e.g. a number of sectors, a number of bits, of servo gaps, a number of bits, etc.). However, the control signals 520 for the calibration process of some embodiments may include more or fewer settings as the preamp may have default settings or may derive some settings based on others in the field. For example, in some embodiments, the write heater current may not be specified in the control signals 520 for each laser current setting and the preamp 504 may be configured to determine the write heater current based on the changes in the laser current.

In operation, based on the control signals 520, the preamp 504 may output write signals 522 to a write head of a HAMR drive and receive read signal from a read head of the HAMR drive. During the write process, the preamp 504 may output a laser current 530 and a write heater current 532 to a laser diode and a write heater. In some implementations, the preamp 504 may include additional circuitry (not shown) which may output the laser current 530 and the write heater current 532 in accordance with an instruction from the controller 502. During the calibration process disclosed herein, the preamp may output the laser current 530 and the write heater current 532 in accordance with the fine laser current calibration circuit 508. As mentioned above, circuitry shown has been limited for ease of illustration and understanding.

During the calibration process, the control circuit 506 may output initialization signals 528 to the fine laser current calibration circuit 508. The initialization signals 528 may configure the fine laser current calibration circuit 508 to perform the writing mode portion of the calibration process in accordance with the control signals 520 discussed above and the control circuit 506 may further output a write power signal 526 to the fine laser current calibration circuit 508. In the illustrated example, the fine laser current calibration circuit 508 is configured to automatically adjust the laser current 530 and the write heater current 532 during the calibration process based on the write power signal 526. In some examples, the write power 536 may be a status signal of the preamp 504 which may indicate whether the preamp is writing or not writing (e.g. while in a write mode or in general). For example, the write power 526 may be low or false when the preamp is not writing and high or true when the preamp is writing when in a write mode (see e.g., 702 of FIG. 7 discussed below). In some examples, the preamp may be not writing when reading servo information or inter-sector symbols. In some examples, the fine laser current calibration circuit 508 may operate to change the laser current 530 and the write heater current 532 based at least in part on changes in the write power signal 526.

More particularly, in some examples, the gap timer 510, edge detector 512, and counter 514 may operate to trigger a loop control 516 to step or adjust the laser current 530 and the write heater current 532 based on gaps in the write power signal 526 (e.g. changes in the voltage level from high-to-low-to-high or vice versa). Such gaps may be caused by various operations. Two example types of gaps in the write power signal 526 which may be used during the calibration process are inter-sector gaps (ISGs) between sequential data sectors on the storage surface and servo gaps (SGs) which may include servo information used to determine the position of the read/write head over the storage surface. During a write process, gaps may occur in the write power signal 526 at ISGs and SGs while, during a write mode, writing stops and reading may occur before writing begins again.

In some embodiments, the gap timer 510 and edge detector 512 may operate to detect one or more types of gaps in the write power signal 526. When a gap is detected, the timer 510 may cause the counter 514 to increment. In some examples, ISGs and SGs may have different widths or times. In some embodiments, the gap timer 510 and edge detector 512 may include a capacitor that may be charged by the write power signal 526 and a circuit that may determine a charge level of the capacitor when a rising edge is detected in the write power signal 526. After a falling edge in the write power signal 526, the charge of the capacitor may begin to decrease. The edge detector 512 may detect a rising edge in the write power signal 526 and, in response to the rising edge, case the gap timer 510 to compare the charge level of the capacitor to a threshold level. For example, if the calibration process operates off of ISGs and ignores SGs and ISGs are shorter or narrower than SGs, the gap timer 510 may determine a gap to be an ISG if the charge level of the capacitor is above a threshold level. After an ISG is detected and the counter 514 is updated, the gap timer, 510 and edge detector 512 may be reset for the next gap. It should be noted this particular hardware arrangement is merely an example and other arrangements may be utilize.

The counter 514 may increment a count of gaps detected by the gap timer 510 to a threshold. Upon reaching the threshold, the counter 514 may trigger the loop control circuit 516, and reset the count.

The loop control 516 may control the stepping of the laser current 530 and the write heater current 532 in response to the trigger signal from the counter 514. As mentioned above, the stepping of the currents may be through a range with a step size or may be with regard to specified settings. In addition, the loop control 516 may control the stepping of the currents such that multiple repetitions of each current may be performed. For example, the loop control 516 may increase the laser current 530 by steps until a maximum value is reached, then reverse the step direction and decrease the laser current 530 by steps until a minimum value is reached and then repeat. In some examples, the loop control circuit 516 may repeat this pattern until a revolution is completed.

As mentioned above, the loop control circuit 516 may also perform adjustments to the write heater current 532 to counter the changes in fly height which would otherwise result due to the changes in the laser current. In addition or alternatively, the loop control circuit 516 may be programmable to repeat the pattern a specified number of times, for a portion of the track, for a number of sectors, etc. Alternatively, the controller 502 may discontinue the writing mode portion of the calibration process when no more calibration data is sent to the preamp 504 for storage in the HAMR drive.

When the writing mode portion of the calibration process is complete, the controller 502 may cause the written data to be read from the storage medium. The controller 502 may determine average BERs for each laser current 530 and then analyze the determined average BERs to determine a laser current that had an optimal average BER. For example, for each laser current 530, the BER for each sector written using that laser current may be determined. For each of the laser current, an average BER for that laser current may be calculated based on the determined BERs of all sectors written using that laser current.

The calibration process may further determine a laser current that results in the best (e.g., maximum, optimum or otherwise useful) average BER. In some examples, the best average write performance metric may be the lowest (most negative) BER value.

The laser current that had the best average BER may then be used in normal write operations by the HAMR drive.

Many variations would be apparent to one of skill in the art based on this disclosure. It should be noted that write performance metrics other than BER may be calculated, such as SNR, head amplitude, track width, etc. and used in a similar manner. Some embodiments may not distinguish between types of gaps in the write power signal 526. In another example variation, the counter 514 may not be included and the loop control 516 may be triggered for each detected gap. In some embodiments, different best laser currents may be determined for different zones of the storage medium.

Figure 6:
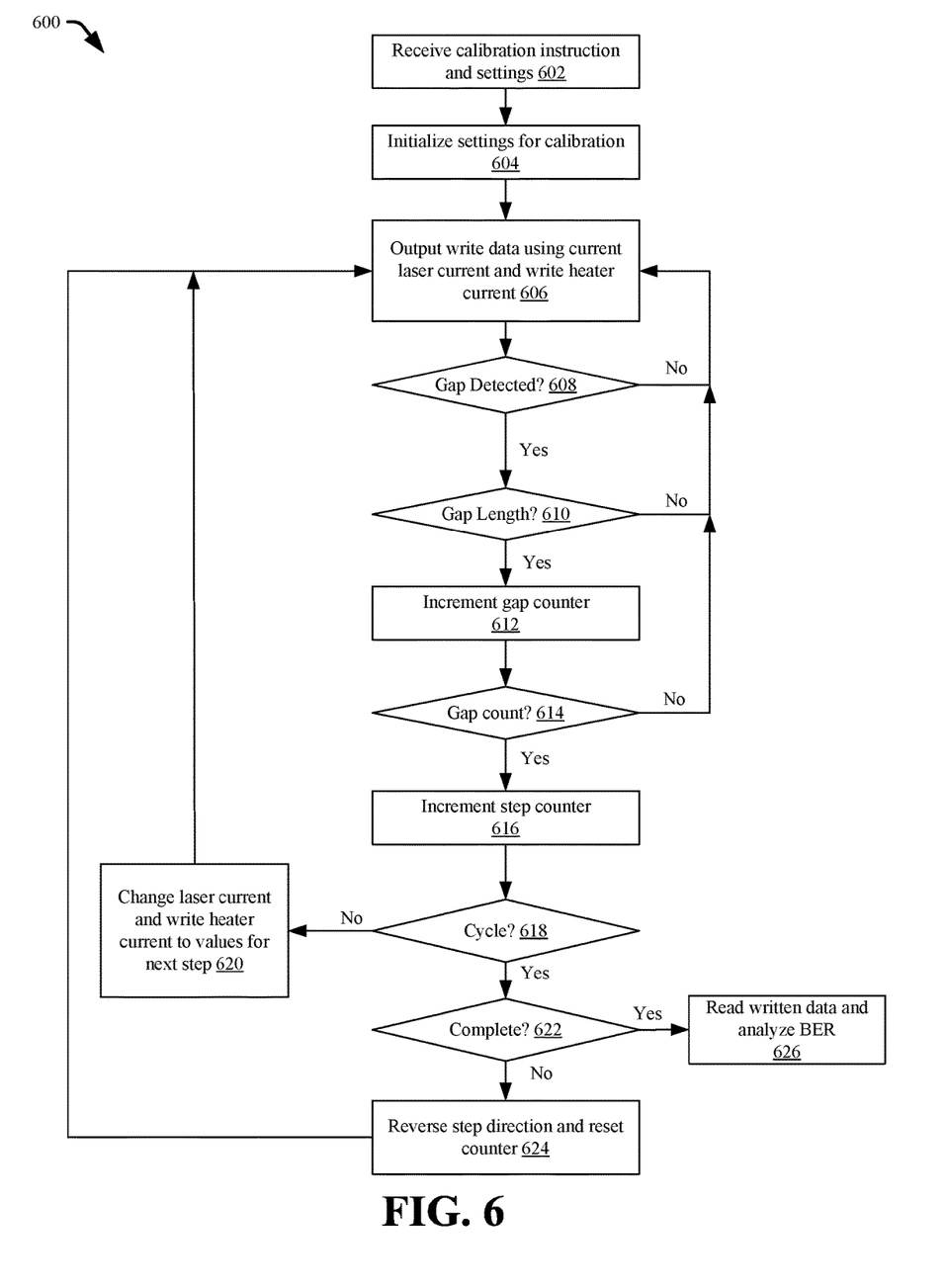
FIG. 6 is a flowchart of a method of laser current calibration, in accordance with certain embodiments of the present disclosure.

Referring to FIG. 6, a flowchart of a method of laser current calibration is shown and generally designated 600, in accordance with certain embodiments of the present disclosure. The method 600 may be performed by the systems described herein, such as systems 100-500. The method 600 may be utilized by a system that drives a laser emitter via a preamplifier. The method 500 may be utilized to automatically determine a laser current that results in a best (e.g., maximum, optimum or otherwise useful) average write performance metric. More particularly, method 600 may illustrate a process flow for laser current calibration in which a range of laser currents and respective write heater currents are stepped through one or more times during the writing of calibration data to a storage medium before being read and analyzed to determine a best performing laser current.

At 602, a preamp may receive a calibration instruction and settings for use in the calibration. The preamp may then initialize the settings in a fine laser current calibration circuit at 604. The operations at 604 may include setting initial laser current and write heater current for the calibration process. The settings may be similar to those discussed above with regard to the control settings 520 and initialization signals 528 of FIG. 5 and these details may be repeated below for some settings.

At 606, data may be written to the storage medium using the current laser current and write heater current. Operation 606 may continue until, at 608, a gap may be detected in a write power signal. In some examples, a gap may be detected based on a rising edge or falling edge in the write power signal. When a gap is detected at 608, the process may continue to 610. At 610, the process may determine whether the gap is the right type of gap. As discussed above, in some examples, the preamp may trigger steps or increment a gap counter for ISGs while SGs may be discarded. The operation 610 may determine whether the gap is an ISG or an SG based on the length of the gap. If the gap is an ISG (or other right or non-discarded type of gap), the process may continue to 612. Otherwise, if the gap is an SG (or other discarded type of gap), the process may return to 606. In some examples, operation 610 may not be included. In effect, such an example embodiment may treat all gaps as right or non-discarded types of gaps.

At 612, a gap counter may be incremented. At 614, the process may determine whether the gap counter has reached a threshold number of gaps to trigger a step in the current values. If not, the process may return to 606. If the gap counter has reached the threshold number of gaps, the gap counter may be reset and the process may continue to 616. In some examples, operations 612 and 614 may not be included which, in effect, may be similar to setting the threshold number of gaps to one. In such an example embodiment, a step or change in the current values is performed for each non-discarded gap.

At 616, a step counter may be incremented. At 618, the process may determine whether the stepping of the current values has reached the end of a cycle (e.g., the end of a range of laser current values, the end of a set of laser currents, etc.). In the illustrated example of FIG. 6, the process may determine whether the step counter has reached a threshold number of steps to reach the end of the range of laser currents being tested. If not, the process may continue to 620. If the step counter has reached the threshold number of steps, the step counter may be reset and the process may continue to 622. In some examples, the process may not include operation 616 and the determination at 618 may be whether the current laser current is the end of the range of laser currents in the current step direction (e.g. whether steps are currently increasing or decreasing the laser current).

At 620, the process may change or step the laser current and write heater current based on a current step direction to values for the next step. As mentioned above, the current step direction may indicate whether steps currently increase or decrease the laser current. The process may then return to 606.

At 622, the process may determine whether the write portion of the calibration process is complete. For example, depending on the embodiment, operation 622 may determine the write portion of the calibration process is complete based on whether one or more revolutions or portions thereof have been written, whether a number of traversals of the range of laser current values have been performed, etc. If the write portion of the calibration process is complete, the process may continue to 626. Otherwise, the process may continue to 624.

At 624, the process may reverse the current step direction and reset the step counter. The process may then return to 606.

At 626, the data written to the storage medium by operations 602-624 may be read and analyzed to determine the laser current (and corresponding to write heater current) that provided the best write performance metric(s) as discussed above with regard to FIG. 5. The determined best laser current setting may then be used in normal write operations.

Many variations on process 600 would be apparent to one of ordinary skill in the art in view of this disclosure. For example, rather than reversing the step direction when the end of the range is reached, some embodiments may reset the currents to the initial settings and repeat the range in the same step direction.

Figure 7:
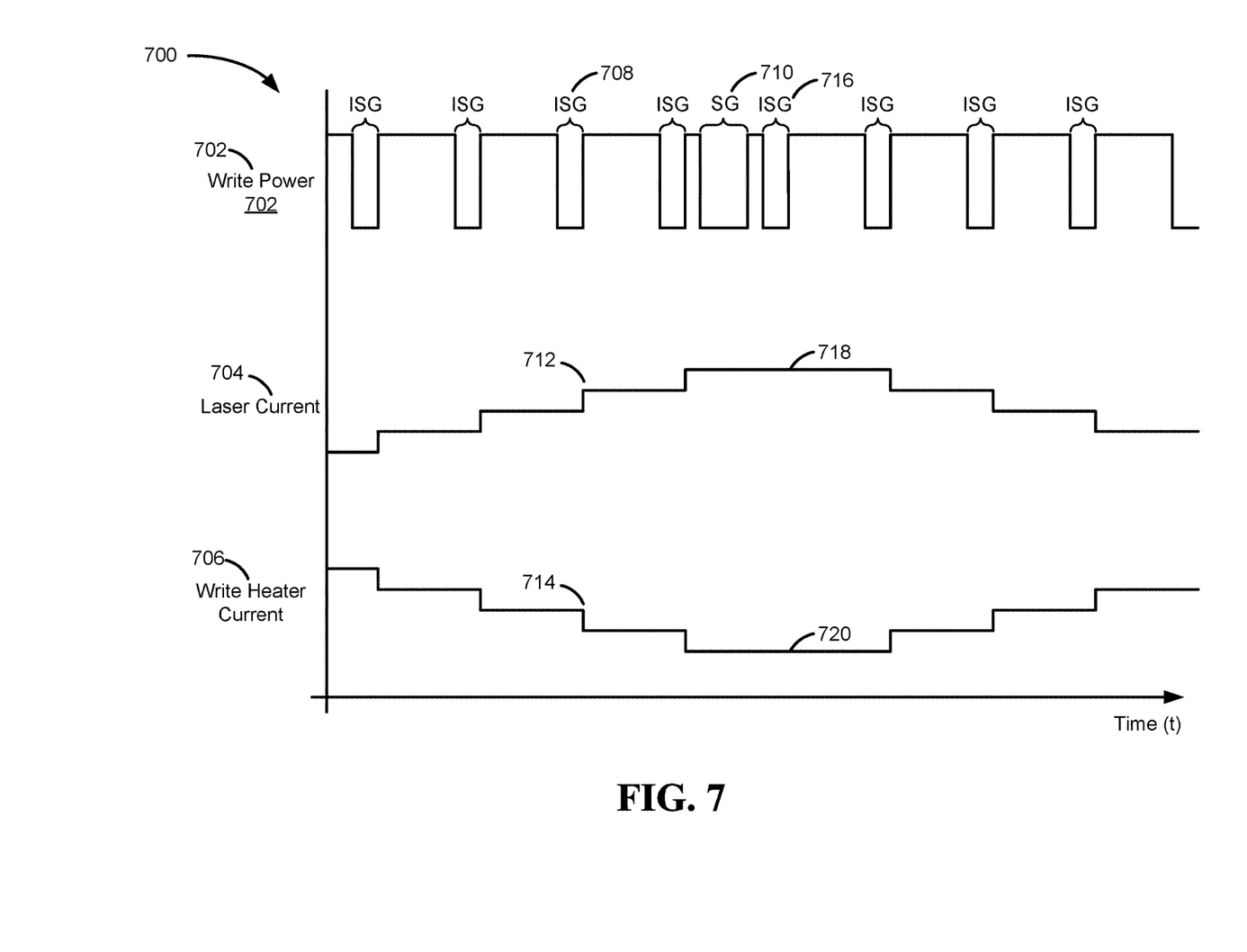
FIG. 7 illustrates example operations of a system during a laser current calibration process, in accordance with certain embodiments of the present disclosure.

FIG. 7 illustrates example operations of a system during a laser current calibration process, in accordance with certain embodiments of the present disclosure. More particularly, FIG. 7 shows a time diagram 700 of the write power signal 702, laser current 704, and write heater current 706 during a fine laser current calibration process according to some embodiments of the present disclosure.

In operation, the fine laser current calibration circuit may step the laser current 704 and write heater current 706 when an ISG (e.g. 708) occurs in the write power signal 702. On the other hand, the fine laser current calibration circuit may not step the laser current 704 and write heater current 706 when an SG (e.g. 710) occurs in the write power signal 702. Example systems and processes to distinguish between ISGs and SGs are provided above in regard to FIGS. 5 and 6. Although FIG. 7 illustrates a step being performed for each ISG, as discussed above with regard to FIGS. 5 and 6, in other examples, steps may be performed after a threshold number of ISGs are detected.

FIG. 7 also illustrates operations of an embodiment such as that shown in FIG. 6 when the end of a range of laser currents is reached. More particular, ISG 716 may occur while the laser current is set to the high end of the test range of laser currents while the step direction causes the steps to increase the laser current. As shown, the laser current and write heater current remain unchanged at ISG 716 while the step direction is reversed. The steps performed for ISGs after ISG 716 decrease the laser current 708 and increase the write heater current 710.

While the above description includes some embodiments that describe data storage device implementations, the present disclosure is not limited to usage with data storage devices and may apply to calibration of other outputs in a preamp. Further, the elements of the different methods and systems described herein may be combined or modified.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
 a preamplifier circuit including:
  an output to configure a laser current supplied to a laser emitter;
  a laser current calibration circuit configured to control the laser current supplied to the laser emitter during writing of calibration data to a storage medium, the calibration data being used to determine a particular laser current of a plurality of laser currents for the laser emitter, the laser current calibration circuit configured to:
   configure the laser current of the laser emitter to a first laser current of the plurality of laser currents;
   write one or more first sectors while the laser current of the laser emitter is the first laser current;
   detect one or more gaps in a write power signal while the laser current of the laser emitter is the first laser current; and
   in response to the detection of the one or more gaps in the write power signal:
    configure the laser current of the laser emitter to a second laser current of the plurality of laser currents; and
    write one or more second sectors while the laser current of the laser emitter is the second laser current.

2. The device of claim 1 further comprising the laser current calibration circuit further configured to:
 control a heater current supplied to a write heater; and
 change the heater current from a first heater current of a plurality of heater currents to a second heater current of the plurality of heater currents in response to the detection of the one or more gaps in the write power signal.

3. The device of claim 2 further comprising the laser current calibration circuit configured to change the heater current from a first heater current of a plurality of heater currents to a second heater current of the plurality of heater currents to reduce or prevent a change in fly height of a read/write head caused by the change in the laser current from the first laser current to the second laser current.

4. The device of claim 1 further comprising the detection of the one or more gaps being a detection of a threshold number of gaps.

5. The device of claim 1 further comprising the laser current control circuit further including one or more programmable current setting registers to store the first laser current and an end laser current of the plurality of laser currents and the laser current control circuit is configured to step the laser current from the second laser current to the end laser current, the laser current control circuit being configured to perform stepping of the laser current in response to detecting one or more gaps since a prior step was performed.

6. The device of claim 5 further comprising the laser current control circuit configured to:

determine that the stepping of the laser current has reached the end laser current;
in response to determining that the stepping of the laser current has reached the end laser current, reversing a stepping direction; and
step the laser current from the end laser current to the first laser current.

7. The device of claim 6 further comprising the laser current control circuit configured to perform the stepping of the laser current from the first laser current to the end laser current and back to the first laser current until an end condition.

8. The device of claim 7 further comprising the end condition being one of:
an end of a revolution of the storage medium,
an end of a predetermined portion of a revolution of the storage medium; and
a number of times the circuit has stepped the laser current from the first laser current to the end laser current and back to the first laser current.

9. The device of claim 1 further comprising the write power signal being a signal indicative of whether writing is being performed and each of the one or more gaps including a first change in the write power signal from writing to not writing and a second change in the write power signal from not writing to writing.

10. The device of claim 9 further comprising the detection of the gap determining whether a length of a gap preceding the second change in the write power signal from not writing to writing matches a threshold condition.

11. The device of claim 10 further comprising the determining of whether the length of the gap preceding the second change in the write power signal from not writing to writing including determining whether a charge level of a capacitor charged by the write power signal matches a charge threshold condition.

12. A circuit comprising:
a preamplifier including:
an output to configure a laser current supplied to a laser emitter;
a laser current calibration circuit configured to control the laser current supplied to the laser emitter by the output during writing of calibration data to a storage medium, the laser current calibration circuit configured to:
configure the laser current of the output to a first laser current of a plurality of laser currents;
write one or more first sectors while the laser current of the output is the first laser current;
detect one or more gaps in a write power signal while the laser current of the output is the first laser current; and
in response to the detection of the one or more gaps in the write power signal:
configure the laser current of the laser emitter to a second laser current of the plurality of laser currents; and
write one or more second sectors while the laser current of the output is the second laser current;
an input that receives read data from a read head, the read data including the calibration data written to the storage medium;
a second output configured to provide the read data to a controller;
the controller configured to:
analyze the calibration data of the read data; and
select a particular laser current of the plurality of laser currents for the laser emitter.

13. The circuit of claim 12 further comprising the write power signal being a signal indicative of whether writing is being performed and each of the one or more gaps including a first change in the write power signal from writing to not writing and a second change in the write power signal from not writing to writing.

14. The circuit of claim 13 further comprising the detection of the gap determining whether a length of a gap preceding the second change in the write power signal from not writing to writing matches a threshold condition.

15. The circuit of claim 14 further comprising the determining of whether the length of the gap preceding the second change in the write power signal from not writing to writing including determining whether a charge level of a capacitor charged by the write power signal matches a charge threshold condition.

16. The circuit of claim 12 further comprising the laser current calibration circuit further configured to:
control a heater current of a write heater; and
change the heater current from a first heater current of a plurality of heater currents to a second heater current of the plurality of heater currents in response to the detection of the one or more gaps in the write power signal.

17. The circuit of claim 16 further comprising the laser calibration circuit configured to change the heater current from a first heater current of a plurality of heater currents to a second heater current of the plurality of heater currents to reduce or prevent a change in fly height of a read/write head caused by the change in the laser current from the first laser current to the second laser current.

18. A method comprising:
configuring a laser current supplied to a laser emitter to be a first laser current of a plurality of laser currents during a writing of one or more first sectors;
detecting one or more intersector gaps in a write power signal while the laser current of the laser emitter is configured to be the first laser current; and
in response to the detection of the one or more intersector gaps in the write power signal:
configuring the laser current supplied to the laser emitter to be a second laser current of the plurality of laser currents during a writing of one or more second sectors.

19. The method of claim 18 further comprising the write power signal being a signal indicative of whether or not writing is being performed and each of the one or more intersector gaps including a first change in the write power signal from writing to not writing and a second change in the write power signal from not writing to writing.

20. The method of claim 19 wherein the method is entirely performed within a single preamplifier integrated circuit.

* * * * *